United States Patent
Yamanishi (10) Patent No.: US 11,163,506 B2
(45) Date of Patent: Nov. 2, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Fumitake Yamanishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/547,719

(22) Filed: Aug. 22, 2019

(65) Prior Publication Data
US 2020/0301629 A1  Sep. 24, 2020

(30) Foreign Application Priority Data

Mar. 20, 2019 (JP) ............................. JP2019-053826

(51) Int. Cl.
| H04N 1/44 | (2006.01) |
| G06F 3/12 | (2006.01) |
| H04N 1/00 | (2006.01) |

(52) U.S. Cl.
CPC .......... *G06F 3/1222* (2013.01); *G06F 3/1238* (2013.01); *H04N 1/4433* (2013.01)

(58) Field of Classification Search
CPC ...... G06F 3/1222; G06F 3/1238; G06F 3/122; G06F 21/31; G06F 21/33; G06F 21/64; H04N 1/4433; H04N 2201/3235

USPC ................................................ 358/1.11–1.18
See application file for complete search history.

(56) References Cited

U.S. PATENT DOCUMENTS

| 9,384,434 | B2 | 7/2016 | Adachi | |
| 2009/0231353 | A1* | 9/2009 | Han | H04N 1/00222 345/581 |
| 2014/0215576 | A1* | 7/2014 | Sugiyama | G06F 21/608 726/4 |
| 2014/0240765 | A1* | 8/2014 | Nishida | G06F 3/1287 358/1.15 |
| 2014/0376027 | A1* | 12/2014 | Adachi | G06K 15/4095 358/1.14 |
| 2017/0085730 | A1* | 3/2017 | Maeda | H04N 1/00917 |
| 2019/0356806 | A1* | 11/2019 | Bhaskaran | H04N 1/00307 |

FOREIGN PATENT DOCUMENTS

JP  6223009 B2  11/2017

* cited by examiner

*Primary Examiner* — Chad Dickerson
(74) *Attorney, Agent, or Firm* — Oliff PLC (57) ABSTRACT

An information processing apparatus includes an extraction unit and a setting unit. When a job for a specific process is obtained, the extraction unit extracts any piece of multiple different predetermined pieces of first policy information. The setting unit sets the extracted first policy information as second policy information to an execution unit. The extracted first policy information is extracted by the extraction unit. The execution unit does the job on the basis of the second policy information. The second policy information is different from the first policy information.

16 Claims, 7 Drawing Sheets

| SECURITY SETTINGS | | · AUTHENTICATION SYSTEM: INTERNAL AUTHENTICATION<br>· AUDIT LOG: ENABLED<br>· CERTIFICATE SETTING: REQUIRED<br>· IPSec SETTING: ENABLED<br>· 802.1X SETTING: DISABLED<br>· SSL/TLS SETTING: ENABLED<br>· S/MIME SETTING: ENABLED<br>· PROTOCOL VERSION: TLS 1.2 |
|---|---|---|
| EQUIPMENT SETTINGS | PRINT SETTING | · BLACK-AND-WHITE PRINTING<br>· DUPLEX PRINTING |
| | SCAN SETTING | · FULL COLOR<br>· PDF FORMAT |
| | FAX SETTING | · NOT ALLOWED |
| | COPY SETTING | · BLACK-AND-WHITE PRINTING<br>· DUPLEX PRINTING |

| SECURITY SETTINGS | | · AUTHENTICATION SYSTEM: INTERNAL AUTHENTICATION<br>· AUDIT LOG: ENABLED<br>· PROTOCOL VERSION: TLS 1.2 |
|---|---|---|
| EQUIPMENT SETTINGS | PRINT SETTING | · NOT ALLOWED |
| | SCAN SETTING | · NOT ALLOWED |
| | FAX SETTING | · NOT ALLOWED |
| | COPY SETTING | · BLACK-AND-WHITE PRINTING<br>· DUPLEX PRINTING |

| USER | AFFILIATION | POLICY INFORMATION |
|---|---|---|
| — | — | COMMON POLICY |
| A1 | A INC. | POLICY A |
| A2 | A INC. | POLICY A |
| A3 | A INC. | POLICY A |
| B1 | B CORP. | POLICY B |
| B2 | B CORP. | POLICY B |
| C1 | DEPARTMENT P OF C CO. | POLICY C1 |
| C2 | DEPARTMENT P OF C CO. | POLICY C1 |
| C3 | DEPARTMENT Q OF C CO. | POLICY C2 |
| C4 | DEPARTMENT Q OF C CO. | POLICY C2 |

FIG. 4A

| SECURITY SETTINGS | | · AUTHENTICATION SYSTEM: INTERNAL AUTHENTICATION<br>· AUDIT LOG: ENABLED<br>· CERTIFICATE SETTING: REQUIRED<br>· IPSec SETTING: ENABLED<br>· 802.1X SETTING: DISABLED<br>· SSL/TLS SETTING: ENABLED<br>· S/MIME SETTING: ENABLED<br>· PROTOCOL VERSION: TLS 1.2 |
|---|---|---|
| EQUIPMENT SETTINGS | PRINT SETTING | · BLACK-AND-WHITE PRINTING<br>· DUPLEX PRINTING |
| | SCAN SETTING | · FULL COLOR<br>· PDF FORMAT |
| | FAX SETTING | · NOT ALLOWED |
| | COPY SETTING | · BLACK-AND-WHITE PRINTING<br>· DUPLEX PRINTING |

FIG. 4B

| SECURITY SETTINGS | | · AUTHENTICATION SYSTEM: INTERNAL AUTHENTICATION<br>· AUDIT LOG: ENABLED<br>· PROTOCOL VERSION: TLS 1.2 |
|---|---|---|
| EQUIPMENT SETTINGS | PRINT SETTING | · NOT ALLOWED |
| | SCAN SETTING | · NOT ALLOWED |
| | FAX SETTING | · NOT ALLOWED |
| | COPY SETTING | · BLACK-AND-WHITE PRINTING<br>· DUPLEX PRINTING |

FIG. 5

FIG. 6

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053826 filed Mar. 20, 2019.

BACKGROUND

(i) Technical Field

The present disclosure relates to an information processing apparatus and a non-transitory computer readable medium.

(ii) Related Art

Japanese Patent No. 6223009 discloses an image forming apparatus including a receiving unit, a checking unit, and a restricting unit. The receiving unit receives job data which is data for doing a print job from an external apparatus and which includes security data for checking whether or not a predetermined information security policy is satisfied. The checking unit uses the security data, which is received by the receiving unit, to check whether or not the information security policy is satisfied. When the checking unit determines that the information security policy is not satisfied, the restricting unit restricts execution of the print job using the job data.

Shared workspaces for multiple companies to share as office spaces have become more common. The companies using a shared workspace may have different policies about security and the like. In contrast, in a shared workspace, a multi-function information processing apparatus for doing jobs, such as printing and communication, may be installed, and users of the companies may share the information processing apparatus. However, a policy related to execution of a job, including a policy about security and the like, is typically set to a multi-function information processing apparatus. In many cases, the policy may be changed only by an administrator of the electronic device. Accordingly, when a policy related to execution of a job requested by a user in the shared workspace is different from the policy which has been set by the administrator of the electronic device, it is difficult to do the job.

SUMMARY

Aspects of non-limiting embodiments of the present disclosure relate to an information processing apparatus which enables a job to be processed even when a policy related to execution of the job requested by a user is different from the policy which has been set to an execution unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an extraction unit and a setting unit. When a job for a specific process is obtained, the extraction unit extracts any piece of multiple different predetermined pieces of first policy information. The setting unit sets the extracted first policy information as second policy information to an execution unit. The extracted first policy information is extracted by the extraction unit. The execution unit does the job on the basis of the second policy information. The second policy information is different from the first policy information.

BRIEF DESCRIPTION OF THE DRAWINGS

Exemplary embodiments of the present disclosure will be described in detail based on the following figures, wherein.

DETAILED DESCRIPTION

An information processing system, to which an information processing apparatus provided by the present disclosure is applied to exemplary embodiments, will be described below by using the drawings.

First Exemplary Embodiment

The Information Processing System

Figure 1:
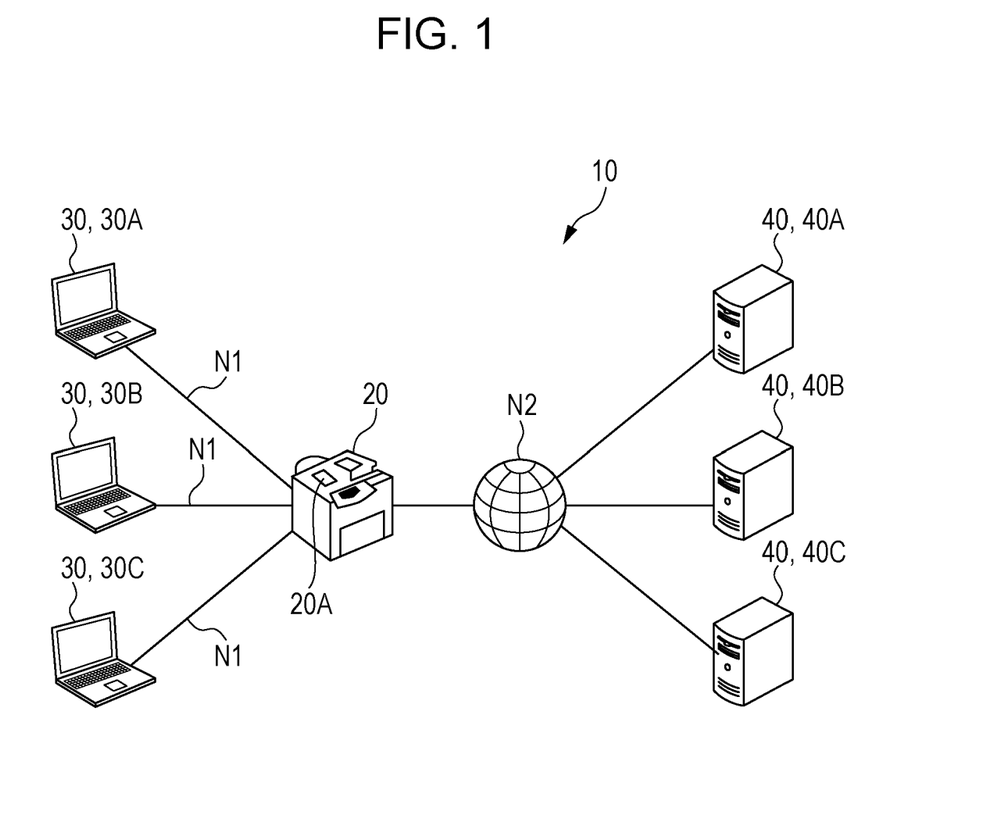
FIG. 1 is a diagram illustrating a schematic configuration of an information processing system according to a first exemplary embodiment.

As illustrated in FIG. 1, an information processing system 10 according to a first exemplary embodiment includes an image forming apparatus 20, multiple personal computers (PCs) 30, and multiple servers 40. The image forming apparatus 20 and the PCs 30, which are terminals connected to the image forming apparatus 20, are disposed, for example, in a shared workspace for multiple companies to share and use as an office space.

In the information processing system 10 according to the first exemplary embodiment, three PCs 30 (PCs 30A to 30C) and three servers 40 (servers 40A to 40C) are connected to a single image forming apparatus 20. However, the number of image forming apparatuses 20, the number of PCs 30, and the number of servers 40 are not limited to these. The image forming apparatus 20 is an exemplary information processing apparatus.

The image forming apparatus 20 and each of the PCs 30 are connected to a network N1 formed of a wired local-area network (LAN) or a Wi-Fi™ wireless LAN which is disposed in the shared workspace. For example, in FIG. 1, in the shared workspace, the PC 30A used by a user of A Inc.

is connected to the image forming apparatus 20; the PC 30B used by a user of B Corp. is connected to the image forming apparatus 20; the PC 30C used by a user of C Co. is connected to the image forming apparatus 20.

The image forming apparatus 20 is interconnected to the servers 40 through the Internet N2. For example, in FIG. 1, the image forming apparatus 20 is connected to the server 40A of A Inc., the server 40B of B Corp., and the server 40C of C Co.

The Image Forming Apparatus

The image forming apparatus 20 forms an image on a recording medium such as a sheet of paper on the basis of a job given through a user instruction, stores an image which is read by using a scan unit 27 described below, and transmits an image to the outside.

Figure 2:
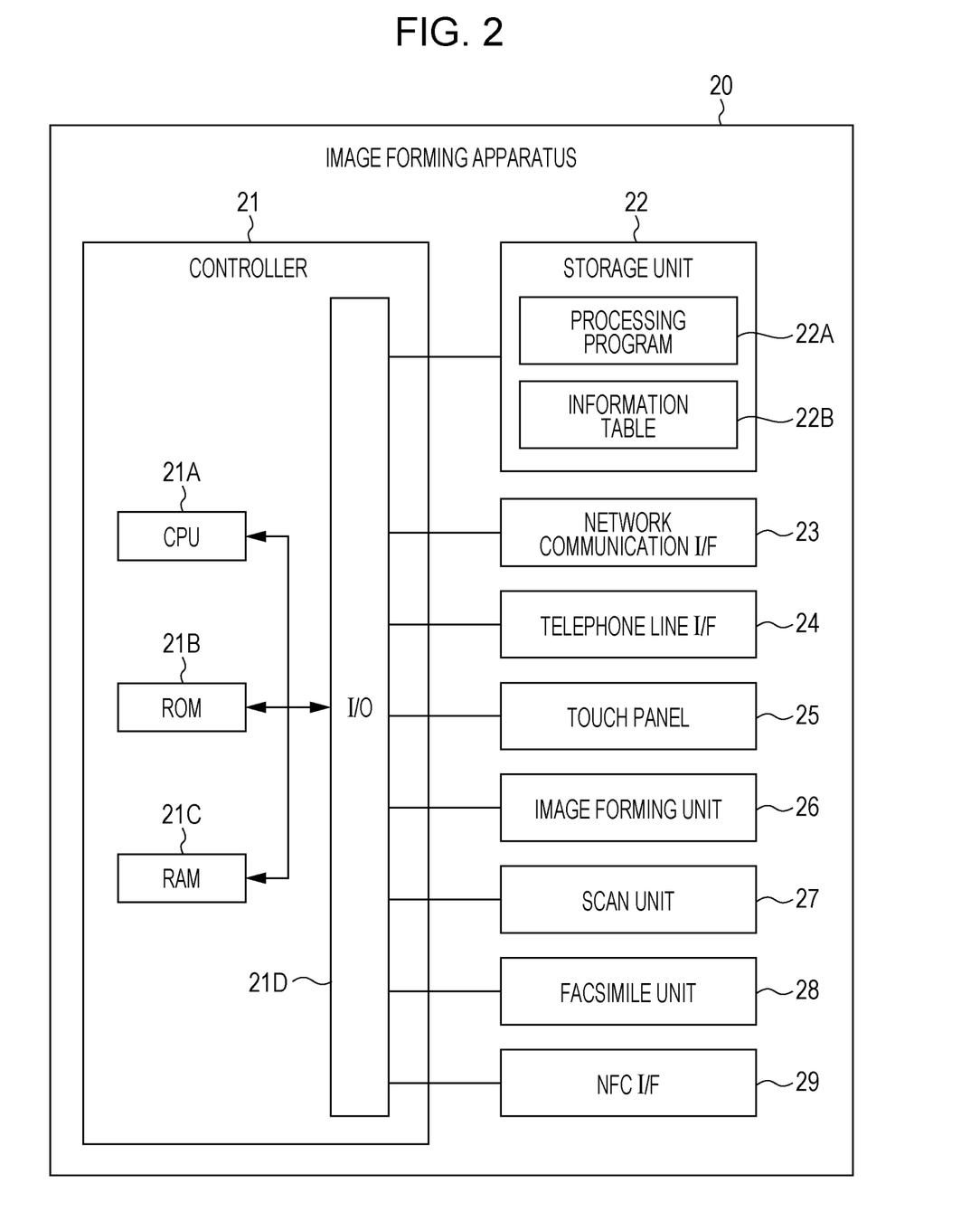
FIG. 2 is a block diagram illustrating the hardware configuration of an image forming apparatus according to the first exemplary embodiment.

FIG. 2 is a block diagram illustrating an exemplary hardware configuration of the image forming apparatus 20 according to the first exemplary embodiment.

As illustrated in FIG. 2, the image forming apparatus 20 according to the first exemplary embodiment includes a controller 21, a storage unit 22, a network communication interface (I/F) 23, a telephone line I/F 24, a touch panel 25, an image forming unit 26, the scan unit 27, a facsimile unit 28, and a near field communication (NFC) I/F 29. Each of the image forming unit 26, the scan unit 27, and the facsimile unit 28 is an exemplary execution unit.

The controller 21 includes a central processing unit (CPU) 21A, a read only memory (ROM) 21B, a random access memory (RAM) 21C, and an input/output interface (I/O) 21D which are connected to each other through a bus.

The functional units, including the storage unit 22, the network communication I/F 23, the telephone line I/F 24, the touch panel 25, the image forming unit 26, the scan unit 27, the facsimile unit 28, and the NFC I/F 29, are connected to the I/O 21D. The functional units may communicate with the CPU 21A through the I/O 21D.

The controller 21 may be formed as a sub-controller controlling a subset of the operations of the image forming apparatus 20, or may be formed as a part of the main controller controlling the entire operations of the image forming apparatus 20.

As the storage unit 22, for example, a hard disk (HDD), a solid state drive (SSD), or a flash memory is used. The storage unit 22 stores a processing program 22A for performing processes according to the first exemplary embodiment, and an information table 22B describing correspondences between users and policy information described below. The processing program 22A is an exemplary program. The processing program 22A and the information table 22B may be stored in the ROM 21B.

Figure 3:
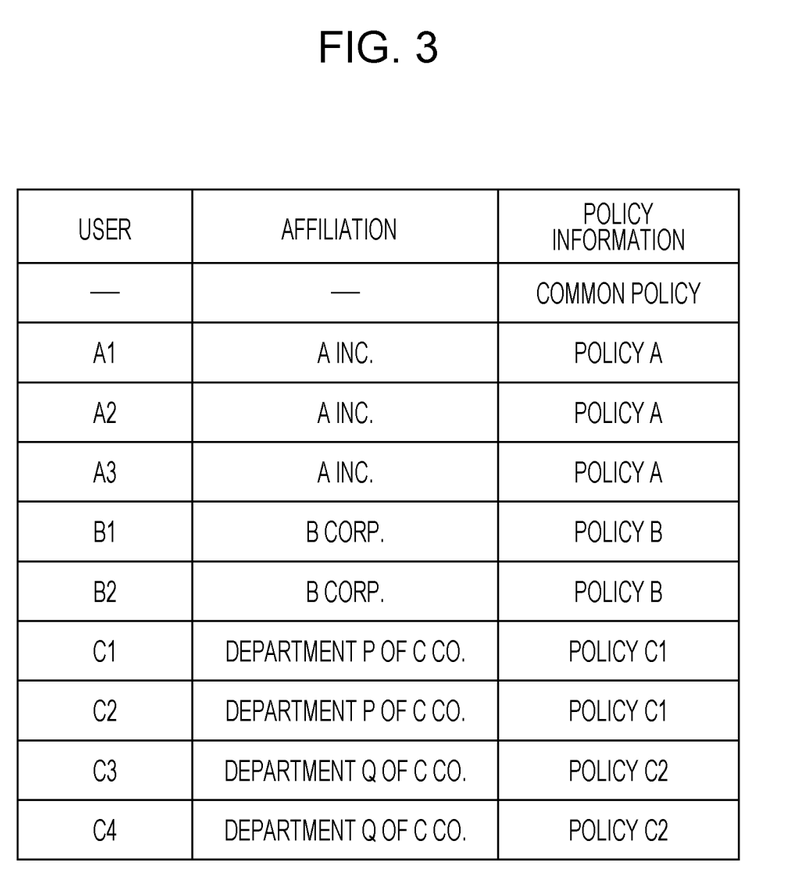
FIG. 3 is a diagram for describing an information table according to the first exemplary embodiment.

As illustrated in FIG. 3, the user who is to be connected to the image forming apparatus 20, the affiliation, and the policy information that is to be applied are stored in the information table 22B. The user is stored as a user identification (ID). The user ID is exemplary user information. The affiliation is information indicating which organization the user belongs to. The affiliation stores, for example, corporate information about a company or an organization, site information about its address or its business offices, and department information about its departments.

Herein, the policy information indicates information describing policies or rules for predetermined security and equipment settings. The policy information includes common policy information which indicates common policies independent of the users or the affiliations, and also includes affiliation policy information which is set for each affiliation. The image forming apparatus 20 has a configuration in which any one of the pieces of relevant policy information may be set. Specifically, in the image forming apparatus 20 according to the first exemplary embodiment, a predetermined piece of policy information is set as the set policy information. The affiliation policy information is exemplary first policy information. The set policy information is exemplary second policy information.

In the example in FIG. 3, users A1 to A3, who are employees of A Inc. for which the policy A is applied, are stored in the information table 22B. Users B1 and B2, who are employees of B Corp. for which the policy B is applied, are stored in the information table 22B. In information table 22B, users C1 and C2, who are employees of Department P of C Co. for which the policy C1 is applied, are stored; users C3 and C4, who are employees of Department Q of C Co. for which the policy C2 is applied, are stored. Since a policy is applied to each department of C Co., the affiliation information for each department is also stored.

Figure 4A:
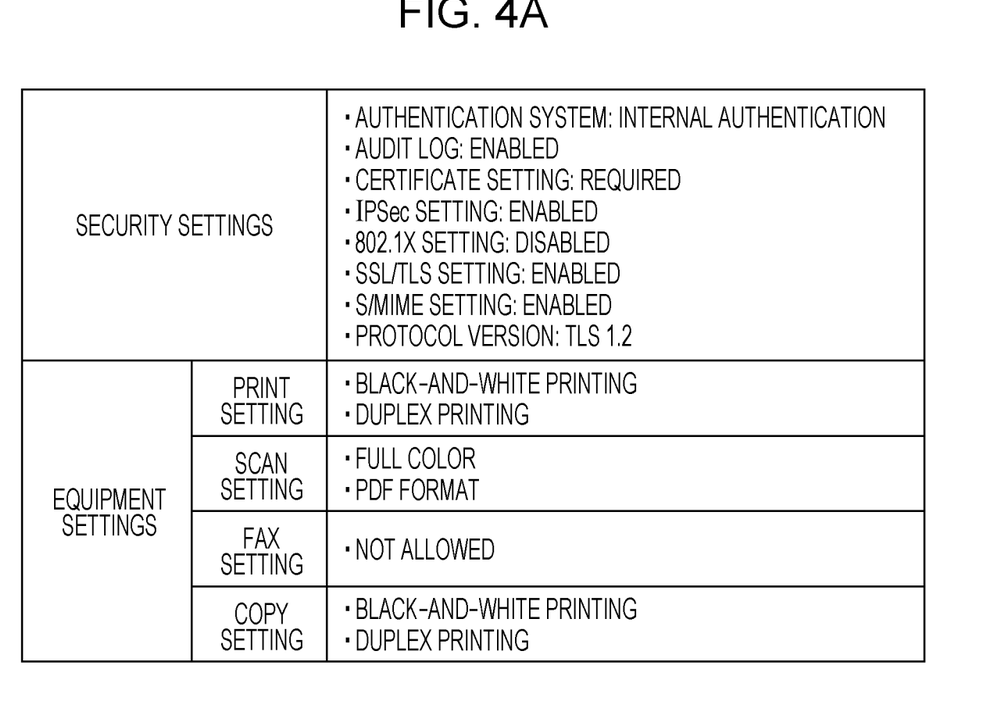
FIG. 4A is a diagram illustrating a first example of policy information.
Figure 4B:
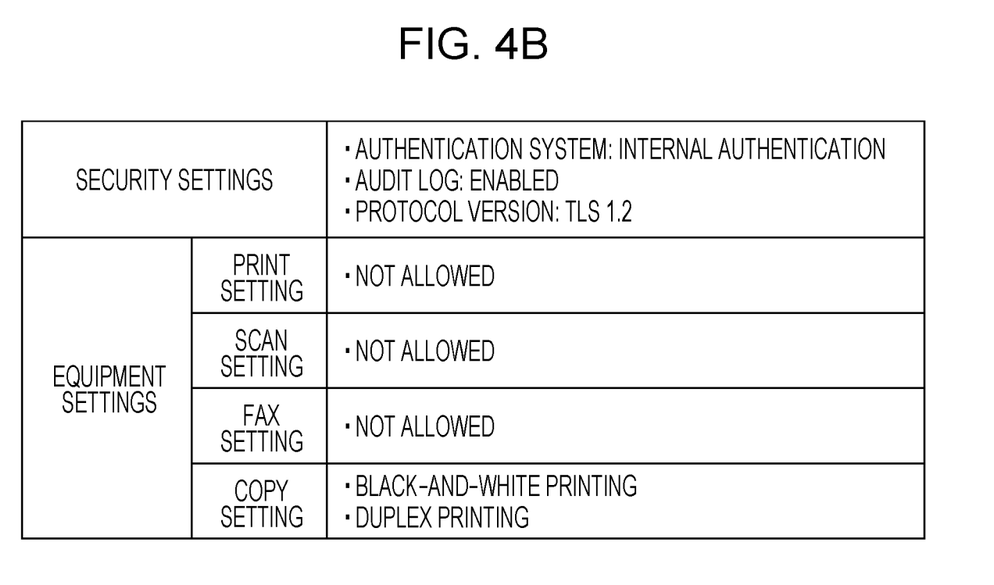
FIG. 4B is a diagram illustrating a second example of policy information.

FIG. 4A illustrates a first concrete example of policy information. FIG. 4B illustrates a second concrete example of policy information. As illustrated in FIGS. 4A and 4B, the security settings in the first example store rules about the certificate setting, the SSL/TLS setting, the S/MIME communication, and the like which are not stored in the second example. In the equipment settings in the second example, the print setting and the scan setting, which are permitted to be used in the first example, are prohibited.

In the first exemplary embodiment, the affiliation policy information is provided by companies or the like which are the affiliations of users. An administrator of the shared workspace inputs the affiliation policy information through the touch panel 25 or a management PC (not illustrated). Thus, the affiliation policy information is reflected in the information table 22B.

As illustrated in FIG. 2, the network communication I/F 23 is an interface for communicating with the PCs 30 by wires or wirelessly.

The telephone line I/F 24 is an interface for communicating with apparatuses such as external FAX receivers through a telephone line.

The touch panel 25, which serves as a user interface (UI), is formed of a combination of a display apparatus, such as a liquid crystal display (LCD) or an organic electro luminescence (EL) display, and a touch sensor using a resistance film system, an electrostatic capacitance system, or the like. A user may use the touch panel 25 to touch buttons and icons on a screen, thus performing various operations. The touch panel 25 may be used in such a manner that the operation unit is separated from the display apparatus.

The image forming unit 26 forms the image of image data on a recording medium according to an instruction from the CPU 21A. The image forming system used by the image forming unit 26 may be any. For example, it may be an electrophotographic system or an inkjet system. The image forming unit 26 is used in execution of the printing function, the copying function, and the faxing function.

The scan unit 27 optically reads a document placed, for example, on platen glass (not illustrated), according to an instruction from the CPU 21A, and converts the document content into image data. The scan unit 27 is used in execution of the scan function.

The facsimile unit 28 receives/transmits document data from/to other apparatuses, having the faxing function, through a telephone line (not illustrated). The facsimile unit 28 is used in execution of the faxing function.

The NFC I/F 29 is an interface for performing wireless communication through near field communication with an integrated circuit (IC) card having an NFC function. The IC card is carried by a user. At least login information is stored in the embedded IC. The NFC I/F 29 includes an antenna for reception/transmission which is provided in an NFC unit 20A (see FIG. 1) disposed on the top surface of the image forming apparatus 20. When an IC card approaches the NFC unit 20A, the NFC I/F 29 establishes a near field communication with the IC card.

Figure 5:
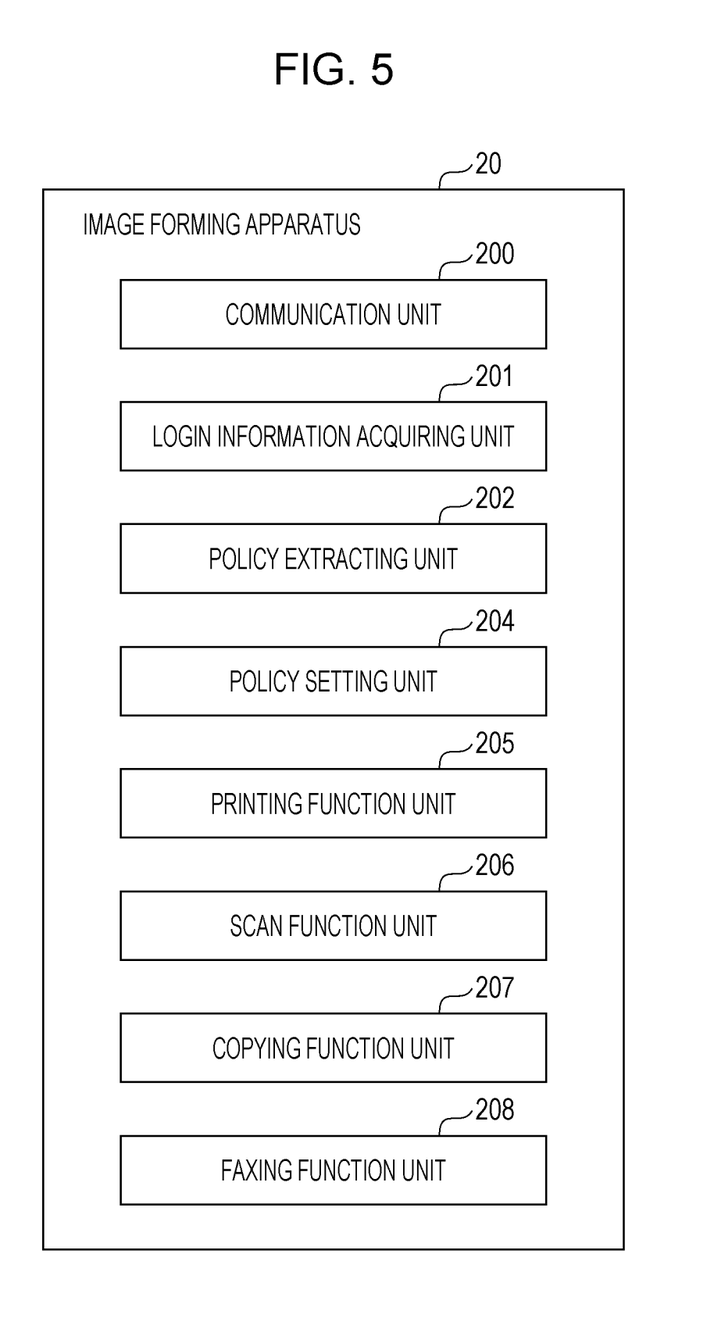
FIG. 5 is a block diagram illustrating an exemplary functional configuration of an image forming apparatus according to the first exemplary embodiment.

FIG. 5 is a block diagram illustrating an exemplary functional configuration of the image forming apparatus 20 according to the first exemplary embodiment. The image forming apparatus 20 according to the first exemplary embodiment functions as a communication unit 200, a login information acquiring unit 201, a policy extracting unit 202, a policy setting unit 204, a printing function unit 205, a scan function unit 206, a copying function unit 207, and a faxing function unit 208. The CPU 21A reads the processing program 22A stored in the storage unit 22, and executes the processing program 22A by using the RAM 21C as a work area so that the image forming apparatus 20 functions as the units illustrated in FIG. 5. The policy extracting unit 202 is an exemplary extraction unit. The policy setting unit 204 is an exemplary setting unit.

The communication unit 200 has a function of communicating with the PCs 30 and the servers 40. The communication unit 200 communicating with a server 40 involves application of an affiliation policy, which is stored in the information table 22B, in accordance with a user who is using the image forming apparatus 20.

The login information acquiring unit 201 has a function of obtaining login information of the user from an IC card which approaches the NFC unit 20A. The login information includes, for example, the user ID representing a user, and a password associated with the user ID.

The policy extracting unit 202 has a function of, when a job for a specific process is obtained, extracting any one of different predetermined pieces of affiliation policy information. Specific processes include execution processes for the printing function, the scan function, the copying function, and the faxing function. Jobs for the specific processes include a print job for execution of the printing function, a scan job for execution of the scan function, a copying job for execution of the copying function, and a faxing job for execution of the faxing function.

In response to acquisition of a job, the policy extracting unit 202 selects, for extraction, affiliation policy information corresponding to the user, who has requested the obtained job, from the information table 22B.

The policy setting unit 204 has a function of setting the affiliation policy information, which is extracted by the policy extracting unit 202, as the set policy information to the image forming unit 26, the scan unit 27, and the facsimile unit 28 which do various jobs.

When execution of various jobs in the image forming unit 26, the scan unit 27, and the facsimile unit 28 ends, the policy setting unit 204 changes the set policy information to policy information different from the current set policy information. The policy information, which has been changed by the policy setting unit 204 after execution of various jobs, is the common policy information predetermined for the image forming apparatus 20, or the default policy information obtained by deleting the set policy information.

When policy information different from the current set policy information is to be set, the policy setting unit 204 according to the first exemplary embodiment extracts differences between the affiliation policy information extracted by the policy extracting unit 202 and the current set policy information. The policy setting unit 204 changes setting items corresponding to the differences, thus setting the policy information. For example, in the examples in FIGS. 4A and 4B, in the case where the second example indicates the current set policy information, in setting the policy information in the first example, the policy setting unit 204 changes only the following items. That is, the policy setting unit 204 changes the settings for the certificate setting, the IPSec setting, the 802.1X setting, the SSL/TLS setting, and the S/MIME communication setting for the security settings. The policy setting unit 204 changes the print setting and the scan setting for the equipment settings.

The printing function unit 205 performs the printing function of forming an image on a recording medium such as a sheet of paper on the basis of a print job received from a PC 30. The printing function unit 205 uses the image forming unit 26 to form the image of image data included in a print job, on a recording medium.

On the basis of a scan job, the scan function unit 206 performs the scan function of storing image data, which is read by the scan unit 27, in the storage unit 22, or transmitting the image data to a specific server 40.

On the basis of a copying job, the copying function unit 207 performs the copying function of using the image forming unit 26 to form image data, which is read by the scan unit 27, as an image on a recording medium.

On the basis of a faxing job, the faxing function unit 208 performs the faxing function of transmitting image data through the facsimile unit 28. The faxing function unit 208 transmits image data, which is obtained by the scan unit 27, or image data, which is obtained from a PC 30, through the telephone line I/F 24. The faxing function unit 208 forms image data, which is received through the telephone line I/F 24, as an image on a recording medium by using the image forming unit 26, or stores the image data in the storage unit 22.

The Process Flow

The flow, according to which the image forming apparatus 20 according to the first exemplary embodiment does a job, will be described by using FIG. 6.

Figure 6:
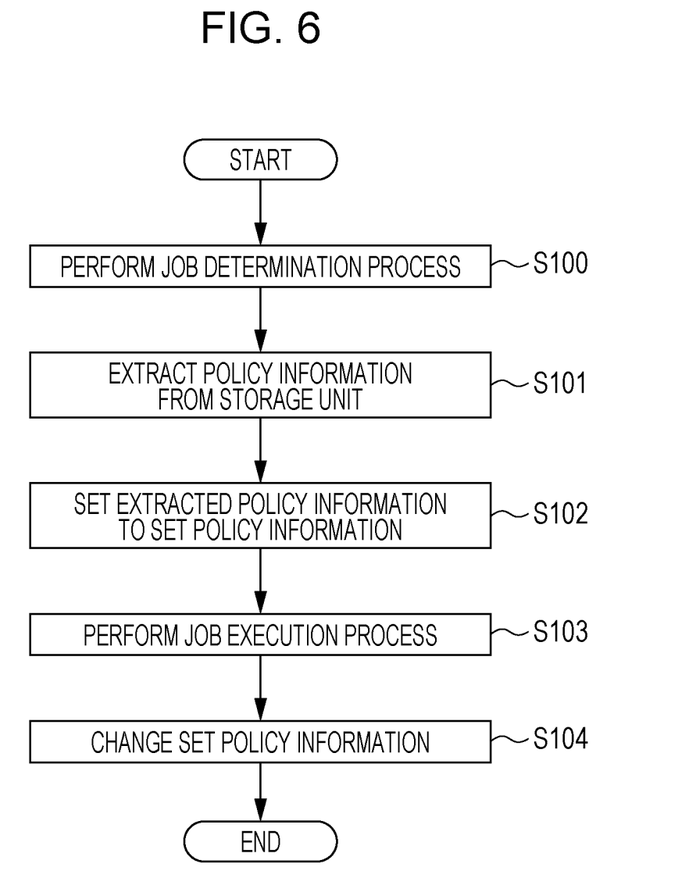
FIG. 6 is a flowchart illustrating a job flow performed by an image forming apparatus according to the first exemplary embodiment.

In step S100 in FIG. 6, the CPU 21A performs a job determination process. The CPU 21A determines whether or not a job has been obtained, and which type of job, a print job, a scan job, a copying job, or a faxing job, the obtained job is. The CPU 21A identifies the user who has requested the job. For example, when a print job is received from a PC 30, the CPU 21A identifies the user on the basis of the user ID included in the received print job. For example, when a scan job is given through an operation on the touch panel 25, the CPU 21A identifies the user on the basis of the user ID obtained from the IC card which approaches the NFC unit 20A prior to the operation on the touch panel 25.

In step S101, the CPU 21A extracts policy information from the storage unit 22. That is, the CPU 21A extracts affiliation policy information corresponding to the user, who has requested the job, by referring to the information table 22B.

In step S102, the CPU 21A sets the extracted policy information to the set policy information. That is, the CPU 21A extracts the differences between the extracted affiliation policy information and the current set policy information, and changes the settings for the extracted differences. Thus, the CPU 21A sets the extracted affiliation policy information as new set policy information. For example, in the case where the initial set policy information is the common policy information and where the policy A is extracted as affiliation policy information, the CPU 21A sets the policy information, indicating the policy A, as new set policy information on the basis of the differences between the common policy information and the policy A.

In step S103, the CPU 21A performs a job execution process. For example, when the printing function is to be performed, the CPU 21A performs the image forming process on the image data, which is included in the print job received from the PC 30, according to the set policy information which has been set. Specifically, in the case where one of the users A1 to A3 of A Inc. uses the PC 30A, when the image forming apparatus 20 receives a print job from the PC 30A, the received print job is done according to the policy A which has been set. In execution of a print job which does not accord with the policy information, the CPU 21A does not perform the image forming process, and notifies the user that the job will not be done.

For example, when the scan function of transmitting image data to a server 40 is to be performed, the CPU 21A establishes a secure communication with the server 40 corresponding to the user, who has requested the job, on the basis of the set policy information which has been set. The CPU 21A transmits image data, which has been obtained through reading by using the scan unit 27, to the server 40 having been connected through the secure communication. Specifically, when the user B1 or B2 gives a scan job in the image forming apparatus 20, image data is transmitted through the secure communication with the server 40B according to the policy B which has been set. When a secure communication with a server 40 fails to be established, the CPU 21A does not transmit image data, and notifies the user that image data will not be transmitted.

In step S104, in response to the end of the job, the CPU 21A changes the set policy information. That is, the CPU 21A changes the new set policy information to the common policy information which is the initial set policy information. The job ends when the processes described above are completed.

Conclusion

In a shared workspace, users of multiple companies may share the image forming apparatus 20. Assume that the policies of the companies about security and the like are different from each other. When the policy information related to execution of a job requested by a user is different from the policy information which has been set in advance to the image forming apparatus 20, it is difficult to perform the job. Accordingly, in response to acquisition of a job, the image forming apparatus 20 according to the first exemplary embodiment extracts the policy information corresponding to the user, who has requested the job, and sets the extracted policy information. According to the first exemplary embodiment, even when the policy information related to execution of a job requested by a user is different from the policy information which has been set in advance to the image forming apparatus 20, the job is done.

In particular, according to the first exemplary embodiment, compared with the case in which users who share the image forming apparatus 20 use the same policy information, the policy which is to be set for each user is applied.

In the image forming apparatus 20 according to the first exemplary embodiment, affiliation policy information is set to the set policy information on the basis of the information table 22B stored in the storage unit 22. According to the first exemplary embodiment, for example, when a print job is transmitted from a PC 30, compared with the case in which the print job includes the affiliation policy information, the processing load of the PC 30, which generates the print job, is alleviated.

In the image forming apparatus 20 according to the first exemplary embodiment, the policy information is changed after execution of a job. According to the first exemplary embodiment, compared with the case in which the policy information is held after execution of a job, successive use of the image forming apparatus 20 by a user other than the user who has requested the job may be suppressed.

In particular, in the image forming apparatus 20 according to the first exemplary embodiment, the policy information is changed to the common policy information or the default policy information after execution of a job. That is, according to the first exemplary embodiment, the initial state before execution of a job is recovered after execution of the job. When the policy information is changed after execution of a job, only information depending on the user ID may be deleted. For example, after execution of a scan job for A Inc., the certificate, which has been used, is deleted, and the other settings may remain as they are.

In the image forming apparatus 20 according to the first exemplary embodiment, when affiliation policy information is to be set to the set policy information, changes are made according to the differences between the current set policy information and the extracted affiliation policy information. Thus, the affiliation policy information is set as new set policy information. That is, according to the first exemplary embodiment, compared with the case in which the set policy information is replaced with affiliation policy information as a whole, the processing time for execution of the job may be reduced.

Second Exemplary Embodiment

The image forming apparatus 20 according to a second exemplary embodiment is different from that according to the first exemplary embodiment in the method of setting policy information in execution of a job. The differences from the first exemplary embodiment will be described. The same configuration as that according to the first exemplary embodiment is designated with the same reference numbers, and will not be described.

When policy information different from the current set policy information is to be set, the policy setting unit 204 according to the second exemplary embodiment compares the affiliation policy information, which is extracted by the policy extracting unit 202, with the current set policy information. When the security level of the extracted affiliation policy information is higher than that of the common policy information which has been set by an administrator of the shared workspace, the policy setting unit 204 sets the affiliation policy information, as it is, to the set policy information. When the security level of the common policy information is higher than that of the extracted affiliation policy information, the policy setting unit 204 does not apply the affiliation policy information and sets the common policy information to the set policy information.

In setting the set policy information by using compared pieces of policy information, the policy setting unit 204 may apply any one of the pieces of policy information for each setting item. That is, the policy setting unit 204 may set the set policy information so that a setting having a higher security level between the affiliation policy information and the current set policy information is applied for each setting item.

Assume the case in which the common policy information for the shared workspace includes items having higher security levels than affiliation policy information. In this case, if the affiliation policy information is set to the set policy information, functions that are originally prohibited in the shared workspace may be permitted.

On the other hand, in the image forming apparatus 20 according to the second exemplary embodiment, compared with the case in which affiliation policy information is set to the set policy information without comparison with the common policy information, application of affiliation policy information having a lower security level than the policy information which is preset in the image forming apparatus 20 may be suppressed.

Third Exemplary Embodiment

The image forming apparatus 20 according to a third exemplary embodiment is different from the first and second exemplary embodiments in that affiliation policy information is obtained from a server 40. The differences from the first and second exemplary embodiments will be described below. The same configuration as that of the first exemplary embodiment is designated with the same reference numerals, and will not be described.

In the information processing system 10 according to the third exemplary embodiment, each piece of affiliation policy information is stored in the server 40 of the corresponding affiliation. In the example in FIG. 1, the policy A for A Inc. is stored in the server 40A in A Inc.; the policy B of B Corp. is stored in the server 40B in B Corp.; the policy C1 and the policy C2 for C Co. are stored in the server 40C in C Co.

In the image forming apparatus 20 according to the third exemplary embodiment, the common policy information is stored in the information table 22B, and affiliation policy information is not stored. In the information table 22B, the connection destinations of the servers 40 are stored for the respective user IDs.

The job flow in the image forming apparatus 20 according to the third exemplary embodiment will be described by using FIG. 7.

Figure 7:
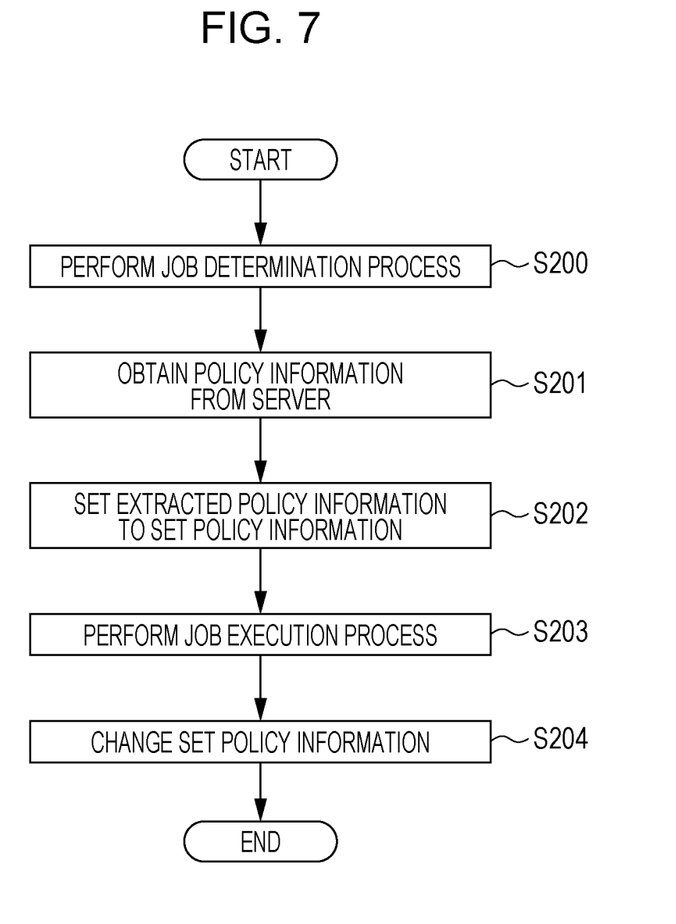
FIG. 7 is a flowchart illustrating a job flow performed by an image forming apparatus according to a third exemplary embodiment.

The process in step S200 in FIG. 7 is substantially the same as the process in step S100.

In step S201, the CPU 21A obtains policy information from a server 40. That is, the CPU 21A transmits a request command to the server 40 corresponding to the user ID of the user, who has requested the job, by referring to the information table 22B, and obtains affiliation policy information, which is to be used for the user ID, from the corresponding server 40.

In step S202 to step S204, substantially the same processes in step S102 to step S104 are performed. The job ends after the processes described above are completed.

As described above, according to the third exemplary embodiment, at the timing of execution of a job, the image forming apparatus 20 obtains the policy information corresponding to the user ID of the user, who has requested the job, from the server 40. Even when the affiliation policy information is updated, the image forming apparatus 20 always applies the latest policy information.

In the third exemplary embodiment, every time a job is to be done, affiliation policy information is obtained from a server 40. However, this is not limiting. For example, the CPU 21A stores the policy information, which is obtained from a server 40, in the information table 22B in association with the user. When the same user is to do a job again, the affiliation policy information is extracted from the information table 22B.

Remarks

The image forming apparatus 20 according to the exemplary embodiments is capable of performing interrupt processing under a certain condition. For example, when a user, who belongs to the same affiliation as that for the current set policy information, gives a job, in other words, when it is not necessary to change the affiliation policy information, the job which has been given later than an existing job is done with higher priority than the existing job.

In the exemplary embodiments, the PCs 30 are illustrated as terminals connected to the image forming apparatus 20. This is not limiting. Terminals connectable to the image forming apparatus 20 include a smartphone, a tablet terminal, and a wearable terminal.

The exemplary embodiments may be implemented by using programs for causing a computer to perform the functions of the units of the image forming apparatus 20. The processing program 22A according to the exemplary embodiments may be stored in a computer-readable non-transitory storage medium, such as a compact disc-read-only memory (CD-ROM), a digital versatile disc-read only memory (DVD-ROM), or a Universal Serial Bus (USB) memory, or may be received from an external server.

In the exemplary embodiments, the case in which processes according to the exemplary embodiments are implemented by using a computer through a software configuration by executing programs is described. This is not limiting. For example, the exemplary embodiments may be implemented through a hardware configuration or a combination of a hardware configuration and a software configuration.

The process flows described in the exemplary embodiments are exemplary. Unnecessary steps may be deleted, new steps may be added, and the process order may be changed without departing from the gist of the present disclosure.

The present disclosure is not limited to the exemplary embodiments described above. Various modifications and applications may be made without departing from the gist of the present disclosure.

What is claimed is:

1. An information processing apparatus comprising:
a processor configured to function as:
an extraction unit that, when a job for a specific process is obtained, extracts any piece of a plurality of different predetermined pieces of first policy information, the first policy information including security settings and rules relating to authorization to perform the job on a chosen equipment, the first policy information being affiliation policy information showing which organization a user requesting the job belongs to; and
a setting unit that sets the extracted first policy information as second policy information to an execution unit of the processor, the extracted first policy information being extracted by the extraction unit, the execution unit doing the job on a basis of the second policy information, the second policy information being set policy information that is different from the first policy information,
wherein, when the execution unit ends execution of the job, the setting unit changes policy information which has been set as the second policy information to the execution unit, to policy information different from the policy information which has been set, and when the setting unit changes the policy information to the policy information different from the policy information which has been set, only a certificate is deleted and other settings from the second policy information are retained.

2. The information processing apparatus according to claim 1, wherein the job indicates request information from a corresponding one of a plurality of users who share the execution unit and who correspond to the different predetermined pieces of first policy information.

3. The information processing apparatus according to claim 2,
wherein the job includes user information indicating the user who requests the job,
wherein a storage unit having a memory which stores a correspondence between the user information and first policy information is involved, and
wherein the setting unit sets the first policy information as the second policy information on a basis of the correspondence stored in the storage unit, the first policy information being stored in the storage unit.

4. The information processing apparatus according to claim 2,
wherein, when the execution unit ends execution of the job, the setting unit changes policy information which has been set as the second policy information to the execution unit, to policy information different from the policy information which has been set.

5. The information processing apparatus according to claim 3,
wherein, when the execution unit ends execution of the job, the setting unit changes policy information which has been set as the second policy information to the execution unit, to policy information different from the policy information which has been set.

6. The information processing apparatus according to claim 4,
wherein the different policy information is predetermined policy information for the execution unit or policy information obtained by deleting the second policy information.

7. The information processing apparatus according to claim 5,
wherein the different policy information is predetermined policy information for the execution unit or policy information obtained by deleting the second policy information.

8. The information processing apparatus according to claim 1,
wherein the setting unit changes, on a basis of a comparison result, policy information which has been set as the second policy information to the execution unit, the comparison result being obtained by comparing the first policy information extracted by the extraction unit and the second policy information.

9. The information processing apparatus according to claim 2,
wherein the setting unit changes, on a basis of a comparison result, policy information which has been set as the second policy information to the execution unit, the comparison result being obtained by comparing the first policy information extracted by the extraction unit and the second policy information.

10. The information processing apparatus according to claim 3,
wherein the setting unit changes, on a basis of a comparison result, policy information which has been set as the second policy information to the execution unit, the comparison result being obtained by comparing the first policy information extracted by the extraction unit and the second policy information.

11. The information processing apparatus according to claim 1,
wherein, for a difference between the first policy information extracted by the extraction unit and the second policy information, the setting unit changes policy information which has been set as the second policy information to the execution unit.

12. The information processing apparatus according to claim 2,
wherein, for a difference between the first policy information extracted by the extraction unit and the second policy information, the setting unit changes policy information which has been set as the second policy information to the execution unit.

13. The information processing apparatus according to claim 3,
wherein, for a difference between the first policy information extracted by the extraction unit and the second policy information, the setting unit changes policy information which has been set as the second policy information to the execution unit.

14. A non-transitory computer readable medium storing a program causing a computer to execute a process, the process comprising:
when a job for a specific process is obtained, extracting any piece of a plurality of different predetermined pieces of first policy information, the first policy information including security settings and rules relating to authorization to perform the job on a chosen equipment, the first policy information being affiliation policy information showing which organization a user requesting the job belongs to; and
setting the extracted first policy information as second policy information to an execution unit, the execution unit doing the job on a basis of the second policy information, the second policy information being set policy information that is different from the first policy information,
wherein, when the execution unit ends execution of the job, the setting changes policy information which has been set as the second policy information to the execution unit, to policy information different from the policy information which has been set, and when the setting changes the policy information to the policy information different from the policy information which has been set, only a certificate is deleted and other settings from the second policy information are retained.

15. An information processing apparatus comprising:
means for, when a job for a specific process is obtained, extracting any piece of a plurality of different predetermined pieces of first policy information, the first policy information including security settings and rules relating to authorization to perform the job on a chosen equipment, the first policy information being affiliation policy information showing which organization a user requesting the job belongs to; and
means for setting the extracted first policy information as second policy information to an means for execution, the extracted first policy information being extracted by the means for extracting, the means for execution doing the job on a basis of the second policy information, the second policy information being set policy information that is different from the first policy information, wherein, when the means for extracting ends execution of the job, the means for setting changes policy information which has been set as the second policy information to the means for extracting, to policy information different from the policy information which has been set, wherein when the means for setting changes the policy information to the policy information different from the policy information which has been set, only a certificate is deleted and other settings from the second policy information are retained.

16. The information processing apparatus according to claim 1, wherein when there is no change of the affiliation policy because a user of a new job request is a user of a same organization with a same affiliation policy as a user of the job for the specific process, the new job request is prioritized over an existing job request even when the new job request was requested later than the existing job request.

\* \* \* \* \*